Patented Oct. 14, 1924.

1,511,874

UNITED STATES PATENT OFFICE.

JOSEF MARIA EDER, OF VIENNA, AUSTRIA.

METHOD OF PROTECTING AGAINST LIGHT OF SHORT WAVE LENGTH AND COMPOSITION OF MATTER THEREFOR.

No Drawing.   Application filed June 2, 1922. Serial No. 565,440.

*To all whom it may concern:*

Be it known that I, Dr. JOSEF MARIA EDER, a citizen of the Republic of Austria, residing at 25, Westbahnstrasse, Vienna VII, Austria, have invented certain new and useful Improvements in Methods of Protecting Against Light of Short Wave Lengths and Composition of Matter Therefor, of which the following is a specification.

The protection of the skin against the action of light of short wave length has hitherto been accomplished by using æsculin and quinine sulphate. These preparations have entirely not met the requirements, the action of both being too weak. In addition to that æsculin is difficultly soluble.

Besides æsculin and quinine sulphate, other substances have been used for protecting the eyes, or dyed textiles, or other goods (particularly in shop windows), against the injurious, or coloring action of the light, for example triphenyl methane and cumarine derivatives. (German Patents No. 119687 and 253334.)

I have made the discovery that compounds containing at least 2 condensed aromatic systems, especially such derivatives of naphthalene as display a blue fluorescence, for instance the naphtholsulphonic acids and their salts, or the naphthylaminesulphonic acids or their salts, or the homologue derivatives of the anthracene have an excellent protective action, and thus are highly suitable:

1, for protecting the skin against the action of light of short wave length for instance against sunburn or other damages caused by light, 2, for the use as preparations for producing photographic or fluorescent layers as sensibilizators or exciters, 3, for ultraviolet-filters.

Although the various mono-, di-, and trisulphonic acids of the naphthol and their salts show a somewhat different absorption of light against ultraviolet rays, they have in common a high capacity of absorbing the most extreme ultraviolet rays to about 360 $\mu\mu$ in several adjoining bands. Accordingly, a part of the ultraviolet of shorter wave length can be cut off selectively, so that only a zone of ultraviolet of a somewhat greater length of waves can act.

Furthermore, I have made the discovery that the absorbing capacity of the salts of the sulphonic acids of naphthol and naphthylamine is highly increased if these substances are made alkaline by basic substances for example alkalies, alkali carbonates, lime, lime-water, or other substances having an alkaline reaction. In such a case the whole of the ultraviolet rays up to the visible violet is strongly absorbed, so that such alkaline compositions surpass as to their absorbing power all the hitherto employed bodies including æsculin. For example the sodium salt of the 2-naphthol-6-8-disulphonic acid in a concentrated aqueous solution, absorbs the whole of the short waved ultraviolet spectrum of the mercury quartz light up to the intensive ultraviolet mercury group of lines of 365 $\mu\mu$, but allows the latter to pass together with the lines of a greater wave length. After an addition of a basic substance for example an alkali, alkali carbonate, lime water or the like, the whole ultraviolet up to the first violet is strongly absorbed, about up to 410 $\mu\mu$.

The sodium salt of 2-naphthol-3-6-di-sulphonic acid and other salts of the naphtholsulphonic acids, or other naphthalene derivatives displaying blue fluorescence, behave similarly.

These preparations counteract the injurious action of the short waved light rays which have the property of irritating living tissues.

The application of the aforesaid compounds takes place in the form either of salves, or of pastes, or of solutions which are applied on the parts of the skin to be protected. The salves, or pastes, or solutions may contain indifferent vehicles, or vehicles and medicaments. The incorporation of the present compounds with the salves, or pastes, or solutions may take place either in substance, or in the form of aqueous or alcoholic solutions of various concentrations. The bodies in question may be applied externally, or be injected or otherwise brought into the parts of the body to be protected.

The salves or pastes or solutions may contain as vehicles or binding agents any of the vehicles known in the art, for example fats, fatty acids, cholesterin esters (for example anhydrous lanoline or lanoline containing water or the like), petrolatum, cephaline, lecithine, resins, albumen, casein, solid or fluid soaps, sugars, honey, glycerine, starch, dextrine, carragheen (mucilage), waxes, cellulose derivatives, cellulose nitrates (collodium), cellulose acetates, cellulose ethers, etc. etc.

They may also contain perfumes, or coloring matters, or filling materials, for instance zinc white, lithopone etc. The preparations made in the aforesaid manner are employed not only for the prevention of all kinds of pathologic conditions (for instance erythema solare, glacier burn, pigmentations, tanned complexion, freckles, summer prurigo, hydroästivale, xeroderma, pigmentosum, pellagra, beriberi etc.), which are caused by the action of the direct, or indirect, or reflecting short rays of sunlight, but they also may be used in the practical therapy based on artifical sources of light (for instance mercury vapour quartz lamp, artificial sunlight, Krommayer lamp, metallic electrode lamp etc. etc.), in order to protect against light those parts of the body which are not desired to be exposed to the action of the short waved light employed thereapeutically.

Compared with the preparations used hitherto the present ones show the advantage of the more complete absorption of the ultraviolet rays. They offer particularly great protection of the human organism against damages caused by the light whilst being harmless for the organism.

The aforesaid preparations or bodies protecting against light may be used not only for medical, or cosmetical purposes, but also for purely photochemical purposes, i. e., in all cases in which the injurious action of particular zones or of the whole ultraviolet is to be eliminated by light filters. In addition to that, they act in appropriate concentrations in photographic layers as sensibilizators or exciters of the fluorescence toward radiant energy especially of a short waved length.

The technical effect consists in the shortening of the exposure through sensibilizators on the one hand, and in the appearence of intensive fluorescent light in such layers or screens on the other. Therefore, such substances may be used as admixtures to photographic emulsions, or as overcoatings of photographic plates or films, or as fluorescent substances in intensifying screens in the X-rays art. In the last mentioned case they may be used by themselves, or in admixture with other fluorescent substances such as calcium tungstate or barium tungstate or zinc sulphide or the like.

Furthermore, I have observed that the protecting action of the present preparations gains in effect if water is present.

Without restricting myself to details, I give the following examples of making salves which protect the skin against light of short waved length.

*Example I.*

45 parts by weight of lanoline are mixed with 10 parts by weight of olive oil. To this mixture are added 1 to 2 parts by weight of the sodium salt of a naphthol disulphonic acid dissolved in 15 parts by weight of lime water or in a weak solution of potassium carbonate.

The well mixed salve is smeared over the part of the skin which is to be protected. The protecting coat is active as long as it remains on the skin.

The protection is excellent. Even a very thin layer, applied to the skin, suffices to prevent the mercury quartz light from bringing about the reddening of the skin. The same holds good with sunlight, or any other light containing ultraviolet rays.

*Example II.*

20 parts by weight of lanoline are mixed with 10 parts by weight of zinc salve (unguentum zinci oxydati). Then 0,5 to 10 parts by weight of the sodium salt of a naphthalene sulphonic acid are dissolved in water and mixed with sodium carbonate until the solution shows a distinct alkaline reaction. Thereupon the alkaline solution of the sodium naphthalene sulphonate is mixed with the lanoline and zinc salve. The preparation is applied as in Example I.

*Example III.*

10 parts by weight of lanoline are mixed with 20 parts by weight of lard containing a small quantity of benzoic acid. To this mixture 0,5 to 4 parts by weight of sodium naphthol-di-sulphonate dissolved in lime water are added, and well mixed.

This preparation is applied as in the foregoing examples.

I claim:

1. The method of protecting against light of short wave length, which comprises applying upon the surface to be protected, a soft preparation containing a derivative of a naphthol sulfonic acid which has a blue fluorescence.

2. The method of protecting parts of the human body against light of short wave length, which comprises the application thereto as a protecting screen, of preparations which contain sulphonic acid compounds of aromatic hydrocarbons having more than one benzene ring.

3. The method of protecting parts of the human body against light of short wave length, which comprises the application thereto as a protective coating, of preparations containing blue fluorescent sulfonic acid derivatives of aromatic hydrocarbons containing at least two condensed benzene rings.

4. The method of protecting bodies against light of short wave length which comprises screening the bodies with a sulfonated compound of an aromatic hydrocarbon containing more than a single benzene ring.

5. The method of protecting bodies against light of short wave length which comprises screening the bodies with an alkali salt of a sulfonated compound of an aromatic hydrocarbon containing more than a single benzene ring.

6. A preparation suitable for protecting against light of short wave length which preparation contains a salt of a sulphonic acid compound of an aromatic body with more than one benzene nucleus, and alkaline substances, in a vehicle, capable of being smeared onto parts of the human body.

7. A preparation suitable for protecting against light of short wave length which preparation contains a salt of a napthol sulfonic acid and an alkaline substance.

8. A preparation for protecting against light of short wave length which preparation contains a salt of a naphthol polysulfonic acid, an alkaline substance and a vehicle.

9. A preparation for protecting against light of short wave length which preparation contains a salt of a naphthol disulfonic acid, an alkaline substance and a vehicle.

10. A preparation for protecting against light of short wave length which preparation contains a blue fluorescent napthalene derivative and a vehicle, capable of application to the skin 11. A preparation for protecting against light of short wave length which preparation contains a blue fluorescent napthalene derivative, a salve vehicle and an alkaline substance.

12. A preparation for protecting against light of short wave length which preparation contains a blue fluorescent napthalene derivative, a salve vehicle, an alkaline substance and water.

13. A preparation for protecting against light of short wave length which prepartion contains a blue fluorescent sulfonated naphthalene derivative and a vehicle capable of application to the skin.

14. A preparation for protecting against light of short wave length which preparation contains a salt of a naphthol disulfonic acid, a salve vehicle, an alkaline substance and water.

In testimony whereof I have affixed my signature to this specification.

Dr. JOSEF MARIA EDER.

Witnesses:
 Carl Tononsky,
 Albin Schiller.